US008295873B2

(12) United States Patent
Iizuka et al.

(10) Patent No.: US 8,295,873 B2
(45) Date of Patent: Oct. 23, 2012

(54) COMMUNICATION TERMINAL AND METHOD FOR USE IN RADIO COMMUNICATION SYSTEM

(75) Inventors: Yousuke Iizuka, Yokosuka (JP); Masato Maeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 378 days.

(21) Appl. No.: 12/760,918

(22) Filed: Apr. 15, 2010

(65) Prior Publication Data

US 2010/0267413 A1 Oct. 21, 2010

(30) Foreign Application Priority Data

Apr. 21, 2009 (JP) ................................. 2009-103133

(51) Int. Cl.
*H04B 7/00* (2006.01)
(52) U.S. Cl. .......... 455/522; 455/445; 455/69; 455/574; 455/447; 370/342; 370/345; 370/335
(58) Field of Classification Search .................. 455/522, 455/69, 445, 452.2, 437, 561, 447, 574, 127.1, 455/127.2, 127.5; 370/335, 345, 237, 342, 370/235, 394, 332, 441
See application file for complete search history.

(56) References Cited

U.S. PATENT DOCUMENTS

| | | | | |
|---|---|---|---|---|
| 7,454,223 | B2* | 11/2008 | Mantha et al. | 455/522 |
| 7,937,087 | B2* | 5/2011 | Goto et al. | 455/437 |
| 8,130,740 | B2* | 3/2012 | Motegi et al. | 370/342 |
| 2003/0108027 | A1* | 6/2003 | Kim et al. | 370/345 |
| 2005/0190697 | A1* | 9/2005 | Dohi et al. | 370/235 |
| 2008/0186862 | A1* | 8/2008 | Corbett et al. | 370/237 |
| 2009/0059883 | A1* | 3/2009 | Kawamoto et al. | 370/342 |
| 2009/0093254 | A1* | 4/2009 | Goto et al. | 455/437 |
| 2009/0201885 | A1* | 8/2009 | Kuroda et al. | 370/335 |
| 2009/0219906 | A1* | 9/2009 | Motegi et al. | 370/342 |
| 2010/0062777 | A1* | 3/2010 | Nadas et al. | 455/445 |

(Continued)

FOREIGN PATENT DOCUMENTS

GB 2 420 250 A 5/2006

(Continued)

OTHER PUBLICATIONS

3rd Generation Partnership Project; Technical Specification Group Radio Access Network; Physical layer procedures (FDD)(Release 6), 3GPP TS 25.214 V6.9.0, Jun. 2006.

(Continued)

*Primary Examiner* — Tan Trinh
(74) *Attorney, Agent, or Firm* — Oblon, Spivak, McClelland, Maier & Neustadt, L.L.P.

(57) ABSTRACT

A disclosed communication terminal includes a determination unit analyzing a received downlink control signal and determining an allowable maximum uplink transmission power level, a measurement unit performing different frequency measurement in a transmission gap period, a threshold determination unit determining whether the allowable maximum level is higher than or equal to a threshold within a predefined period before the start and/or after the end of the transmission gap period, a transmission power control unit setting an uplink transmission power level, and a transmission unit transmitting an uplink signal at the determined power level. If the allowable maximum level is higher than or equal to the threshold, the transmission power control unit sets the uplink transmission power level to or below a predefined level lower than the allowable maximum level within the predefined period before the start and/or after the end of the transmission gap period.

5 Claims, 21 Drawing Sheets

U.S. PATENT DOCUMENTS

| | | | |
|---|---|---|---|
| 2010/0197337 A1* | 8/2010 | Larsson et al. | 455/522 |
| 2010/0234041 A1* | 9/2010 | Larsson et al. | 455/452.2 |

FOREIGN PATENT DOCUMENTS

| | | |
|---|---|---|
| JP | 2002-537676 | 11/2002 |
| JP | 2007-150860 | 6/2007 |
| JP | 2008-11464 | 1/2008 |
| JP | 2008-527908 | 7/2008 |
| JP | 2008-245291 | 10/2008 |

OTHER PUBLICATIONS $3^{rd}$ Generation Partnership Project; Technical Specification Group Radio Access Network; Radio Resource Control (RRC); Protocol Specification (Release 6), 3GPP TS 25.331 V6.9.0, Mar. 2006.

Extended European Search Report issued on Apr. 28, 2011 in corresponding European Application No. 10 25 0783.

Japanese Office Action issued Mar. 29, 2011, in Patent Application No. 2009-103133 (with partial English-language translation).

* cited by examiner

| INDEX | ALLOWABLE MAXIMUM POWER LEVEL |
|---|---|
| 37 | $(168/15)^2*6$ |
| 36 | $(150/15)^2*6$ |
| 35 | $(168/15)^2*4$ |
| 34 | $(150/15)^2*4$ |
| 33 | $(134/15)^2*4$ |
| 32 | $(119/15)^2*4$ |
| 31 | $(150/15)^2*2$ |
| 30 | $(95/15)^2*4$ |
| 29 | $(168/15)^2$ |
| 28 | $(150/15)^2$ |
| 27 | $(134/15)^2$ |
| 26 | $(119/15)^2$ |
| 25 | $(106/15)^2$ |
| 24 | $(95/15)^2$ |
| 23 | $(84/15)^2$ |
| 22 | $(75/15)^2$ |
| 21 | $(67/15)^2$ |
| 20 | $(60/15)^2$ |
| 19 | $(53/15)^2$ |

| INDEX | ALLOWABLE MAXIMUM POWER LEVEL |
|---|---|
| 18 | $(47/15)^2$ |
| 17 | $(42/15)^2$ |
| 16 | $(38/15)^2$ |
| 15 | $(34/15)^2$ |
| 14 | $(30/15)^2$ |
| 13 | $(27/15)^2$ |
| 12 | $(24/15)^2$ |
| 11 | $(21/15)^2$ |
| 10 | $(19/15)^2$ |
| 9 | $(17/15)^2$ |
| 8 | $(15/15)^2$ |
| 7 | $(13/15)^2$ |
| 6 | $(12/15)^2$ |
| 5 | $(11/15)^2$ |
| 4 | $(9/15)^2$ |
| 3 | $(8/15)^2$ |
| 2 | $(7/15)^2$ |
| 1 | $(6/15)^2$ |
| 0 | $(5/15)^2$ |

FIG.8

COMMUNICATION TERMINAL AND METHOD FOR USE IN RADIO COMMUNICATION SYSTEM

BACKGROUND OF THE INVENTION

1. Field of the Invention

The present invention relates to a communication terminal and a method for use in a radio communication system.

2. Description of the Related Art

Recent rapid popularization of the Internet, manifestation of pluralistic information, higher capacity and development of the next generation Internet have been promoting research and development of the next generation radio access schemes for implementing fast radio transmission in mobile communications. In such a fast radio environment, it is important to make not only downlink transmissions but also uplink transmissions faster. The $3^{rd}$ Generation Partnership Project (3GPP) proposes an Enhanced Uplink scheme as an uplink speeding-up technique.

FIG. 1 illustrates a conventional W-CDMA (Wideband-Code Division Multiple Access) based communication system. In uplink communications in accordance with the W-CDMA scheme, data is transmitted in a radio transmission channel called a DPDCH (Dedicated Physical Data CHannel). A base station controls uplink transmission power depending on reception quality of the DPDCHs for communication terminals. For example, the reception quality may be represented by an indicator such as a SIR (Signal-to-Interference Ratio) and a bit error ratio. The base station uses a downlink transmission power control signal called a transmission power control (TPC) bit to control transmission power of the communication terminals within a relatively narrow range such as ±0.5-2 dB. See 3GPP TS25.214 V6.9.0 for this type of technique, for example.

On the other hand, in the Enhanced Uplink scheme, a communication terminal transmits data in a radio transmission channel called an E-DPDCH (Enhanced-Dedicated Physical Data Channel). A base station measures interference of the E-DPDCHs from the communication terminals and determines the allowable maximum of uplink transmission power for the individual communication terminals depending on the measured interference. The allowable maximum of uplink transmission power is derived from scheduling grants generated by the base station. The base station determines the scheduling grant for each of the communication terminals and transmits the scheduling grants to the communication terminals. The communication terminals may transmit uplink signals at the allowable maximum power designated in the scheduling grant or at a power level below the allowable maximum power. The communication terminals make the determination as to which power level is applied to the uplink transmissions. This differs from the W-CDMA based system in that the uplink transmission power is controlled through TPC bits transmitted to the communication terminals in accordance with the W-CDMA system. See 3GPP TS25.331 V6.9.0 for detailed calculation of the allowable maximum power level in the Enhance Uplink scheme, for example.

FIG. 2 schematically illustrates that the uplink transmission power varies over time. As illustrated, the uplink transmission power relatively slowly varies over time in the W-CDMA scheme. On the other hand, the uplink transmission power relatively drastically varies over time in the Enhanced Uplink scheme. The Enhanced Uplink scheme enables a communication terminal to determine the uplink transmission power flexibly. As a result, the uplink transmission power can be controlled more dynamically, resulting in effective utilization and power resources and throughput improvement. Instead, the communication terminal is required to support a wider dynamic range of the uplink transmission power than conventional schemes.

Meanwhile, there are some cases where base stations use different frequencies to accommodate a larger number of users. If a communication terminal presently communicating in a certain frequency migrates to a base station having a different frequency, the communication terminal must perform cell search for the different frequency. In general, the communication terminal has only one frequency oscillator. For this reason, in the cell search for the different frequency, the communication terminal must stop the communications, switch to the different frequency for the cell search and switch back to the original frequency. To this end, a certain time period is predefined for the different frequency measurement in such a system environment so that the communication terminal can measure communication environments for the different frequency. This time period is called a transmission gap. In an operating mode called a compressed mode, the different frequency measurement occurs at a frequency while using the transmission gap. See 3GPP TS25.214 V6.9.0, for example.

FIG. 3 schematically illustrates that the compressed mode is applied to the transmission power control as illustrated in FIG. 2. The communication terminal switches the presently synchronized frequency to a different frequency within the transmission gap and accordingly does not transmit any data during the transmission gap. As a result, the uplink transmission power falls to zero in the transmission gap and significantly varies immediately after the start and the end of the transmission gap.

As stated above, the uplink transmission power may be lower in the W-CDMA scheme than in the Enhanced Uplink scheme. For this reason, the W-CDMA scheme may cause less significant power variations immediately after the start and the end of the transmission gap. Thus, the communication terminal can relatively smoothly stop and restart transmissions.

On the other hand, the Enhanced Uplink scheme may cause highly significant power variations immediately after the start and the end of the transmission gap, as illustrated in FIG. 4, resulting in some problems in the stop and restart of transmissions. For example, a power amplifier (RF amplifier) in the communication terminal cannot follow the drastic power variations, and distorted signals may be transmitted due to inappropriate power. Also, a base station serving as a receiver of uplink signals also fails to follow the drastic power variations of the received signals, which may degrade reception quality such as causing increased bit errors or missing the received signals.

SUMMARY OF THE INVENTION

One object of the present invention is to control the uplink transmission power appropriately near the transmission gap for different frequency measurement in the Enhanced Uplink scheme where a base station indicates allowable maximum uplink transmission power to a communication terminal.

In order to overcome the above-mentioned problems, one aspect of the present invention relates to a communication terminal in an Enhanced Uplink based radio communication system, including: a determination unit configured to analyze a received downlink control signal and determine an allowable maximum uplink transmission power level; a measurement unit configured to perform different frequency measurement in a transmission gap period; a threshold determination unit configured to determine whether the allowable maximum uplink transmission power level is higher than or equal to a threshold within a predefined period before a start of the transmission gap period and/or after an end of the transmission gap period; a transmission power control unit configured to set an uplink transmission power level; and a transmission unit configured to transmit an uplink signal at the uplink transmission power level determined by the uplink transmission power control unit, wherein if the allowable maximum uplink transmission power level is higher than or equal to the threshold, the transmission power control unit sets the uplink transmission power level to or below a predefined level lower than the allowable maximum uplink transmission power level within the predefined period before the start of the transmission gap period and/or after the end of the transmission gap period.

According to the aspect of the present invention, the uplink transmission power can be appropriately controlled near the transmission gap for different frequency measurement in the Enhanced Uplink scheme where a base station indicates allowable maximum uplink transmission power to a communication terminal.

BRIEF DESCRIPTION OF THE DRAWINGS

Other objects, features and advantages of the present invention will become more apparent from the following detailed description when read in conjunction with the accompanying drawings, in which:

FIG. 8 illustrates an exemplary correspondence table between indices and allowable maximum power levels;

DETAILED DESCRIPTION OF THE PREFERRED EMBODIMENTS

Preferred embodiments of the present invention will be described in detail below with reference to the accompanying drawings.

In one embodiment of the present invention, a transmission power control method for alleviating drastic variations of uplink transmission power is proposed for a radio communication system using the enhanced uplink scheme and the compressed mode scheme. Specifically, the uplink transmission power is controlled to be lower than or equal to not only an allowable maximum power level as designated in a serving grant (SG) but also a further lower power level at start times and/or end times of transmission gap periods. According to this embodiment, the drastic power variations occurring at the start times and/or the end times of transmission gap periods can be reduced.

In one embodiment of the present invention, a communication terminal computes the allowable maximum transmission power level depending on a schedule grant transmitted from a base station. The communication terminal transmits uplink signals at or below the allowable maximum power level. If the communication terminal transmits a large amount of information, the communication terminal transmits the uplink signals at the allowable maximum transmission power level for higher throughput. On the other hand, if the communication terminal transmits a small amount of information, the communication terminal transmits the uplink signals at a power level lower than the allowable maximum transmission power level to avoid radiating an excessive amount of radio waves in the environment and reduce interference within the cell. In the compressed mode, even if the communication terminal transmits a large amount of information, the communication terminal is forced to transmit the uplink signals at a power level lower than the allowable maximum transmission power level. Accordingly, it is possible to alleviate drastic variations of the transmission power due to stopping and restarting of transmissions around transmission gap periods. As a result, the transmission of uplink signals can be smoothly stopped and restarted, which can effectively prevent characteristic degradation due to signal distortions or transmission power distribution as experienced conventionally.

First Embodiment

[System]

Figure 1:
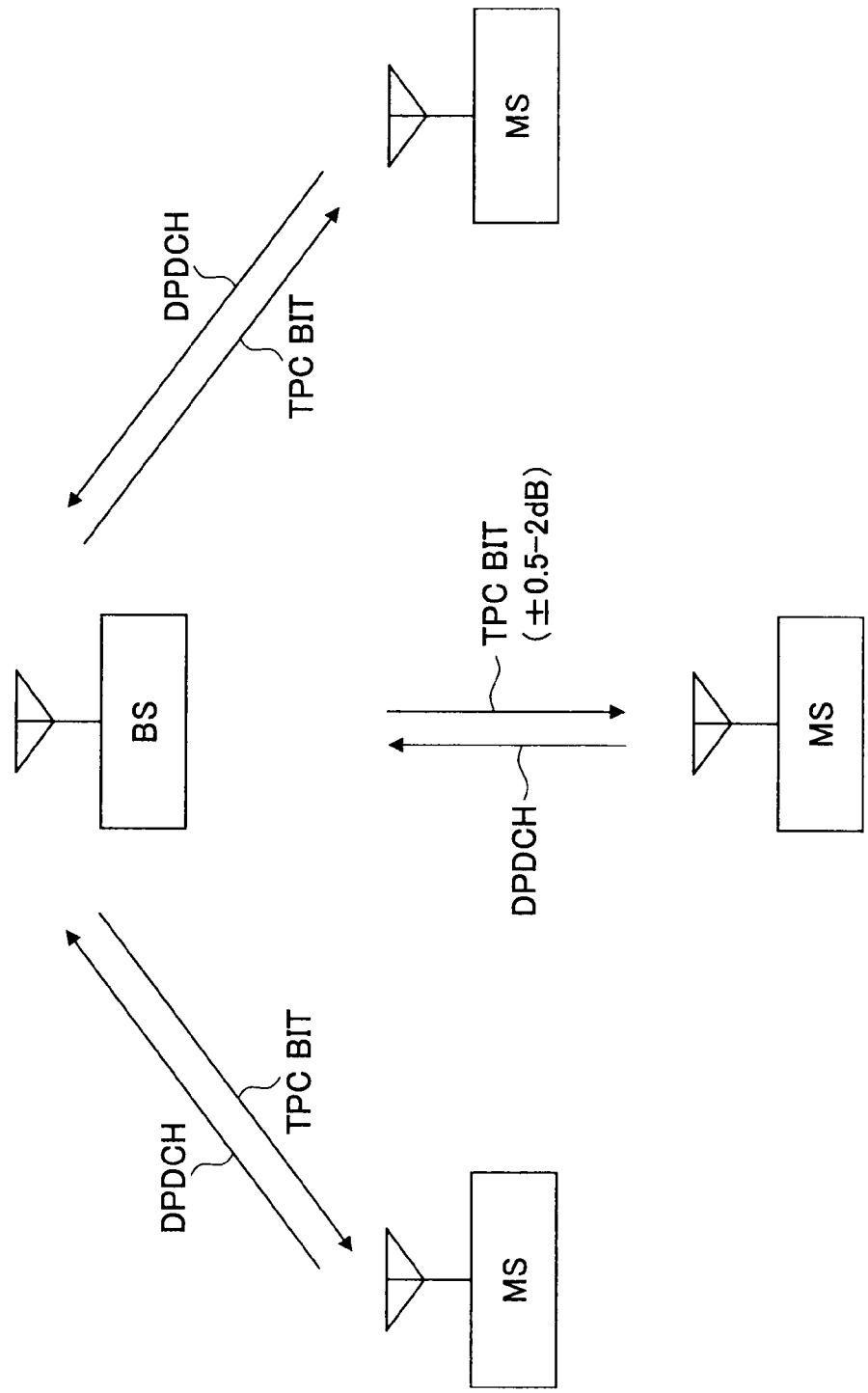
FIG. 1 illustrates a W-CDMA based communication system.
Figure 2:
FIG. 2 schematically illustrates that uplink transmission power varies over time.
Figure 3:
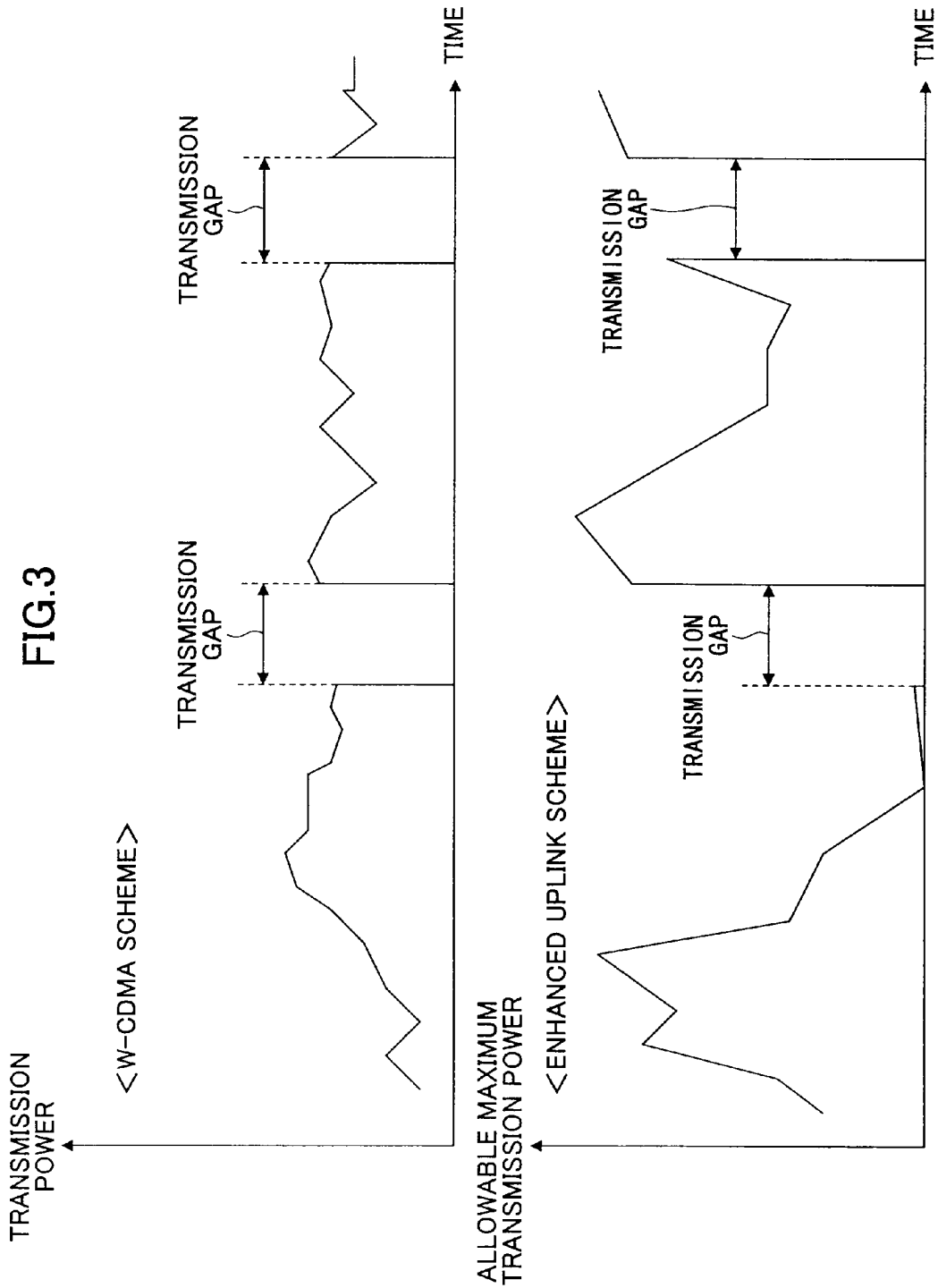
FIG. 3 schematically illustrates that a compressed mode is applied.
Figure 4:
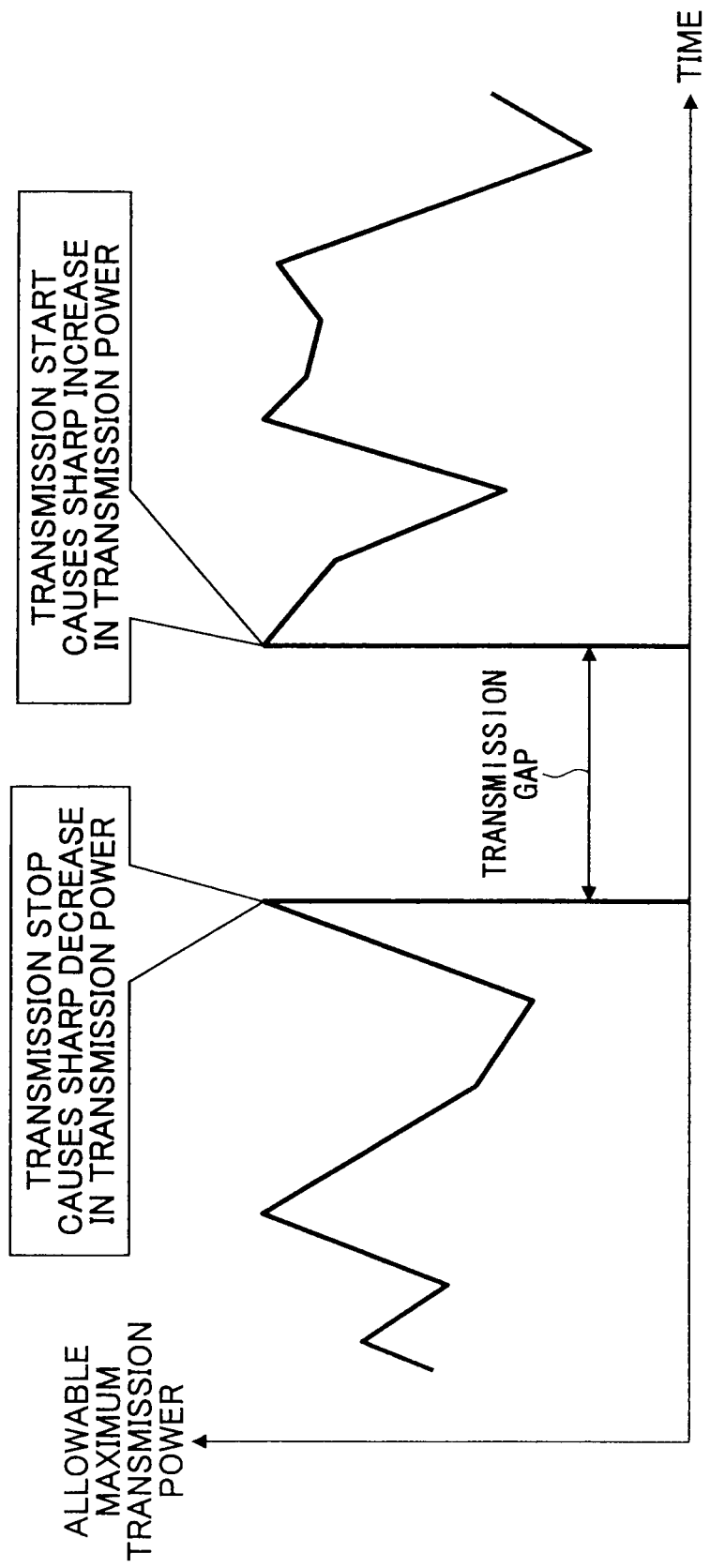
FIG. 4 illustrates that there are drastic power variations near transmission gaps.
Figure 5:
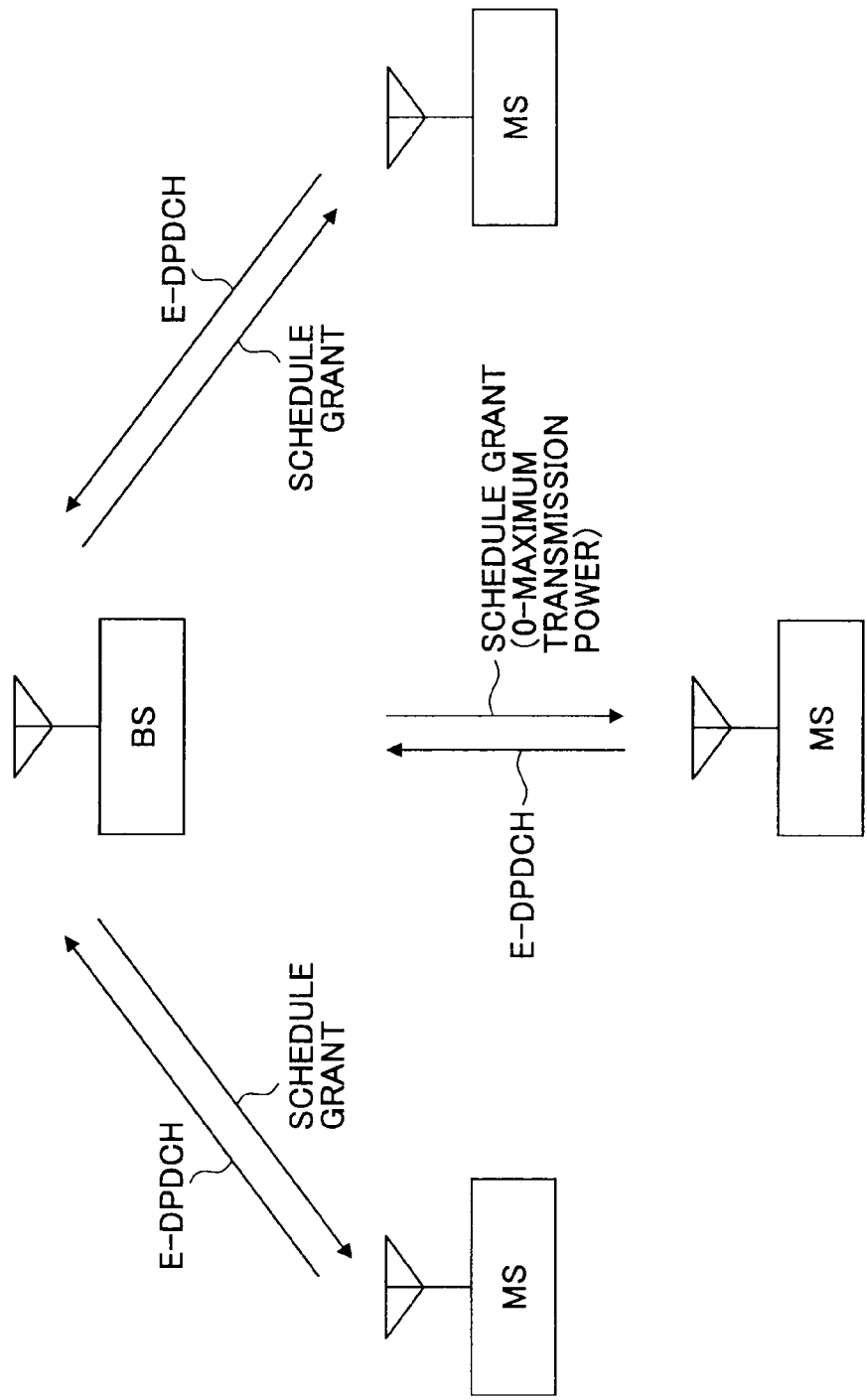
FIG. 5 illustrates an exemplary communication system according to one embodiment of the present invention.

FIG. 5 illustrates a radio communication system according to one embodiment of the present invention. The radio communication system may be an Enhanced Uplink based mobile communication system, for example. In FIG. 5, three communication terminals MSs communicate with each other via a base station BS. However, the present invention is not limited to the radio communication system including the three communication terminals and the single base station, and the radio communication system may include any number of communication terminals and base stations. Typically, the communication terminals may be user apparatuses such as mobile terminals but may be fixed terminals.

Figure 6:
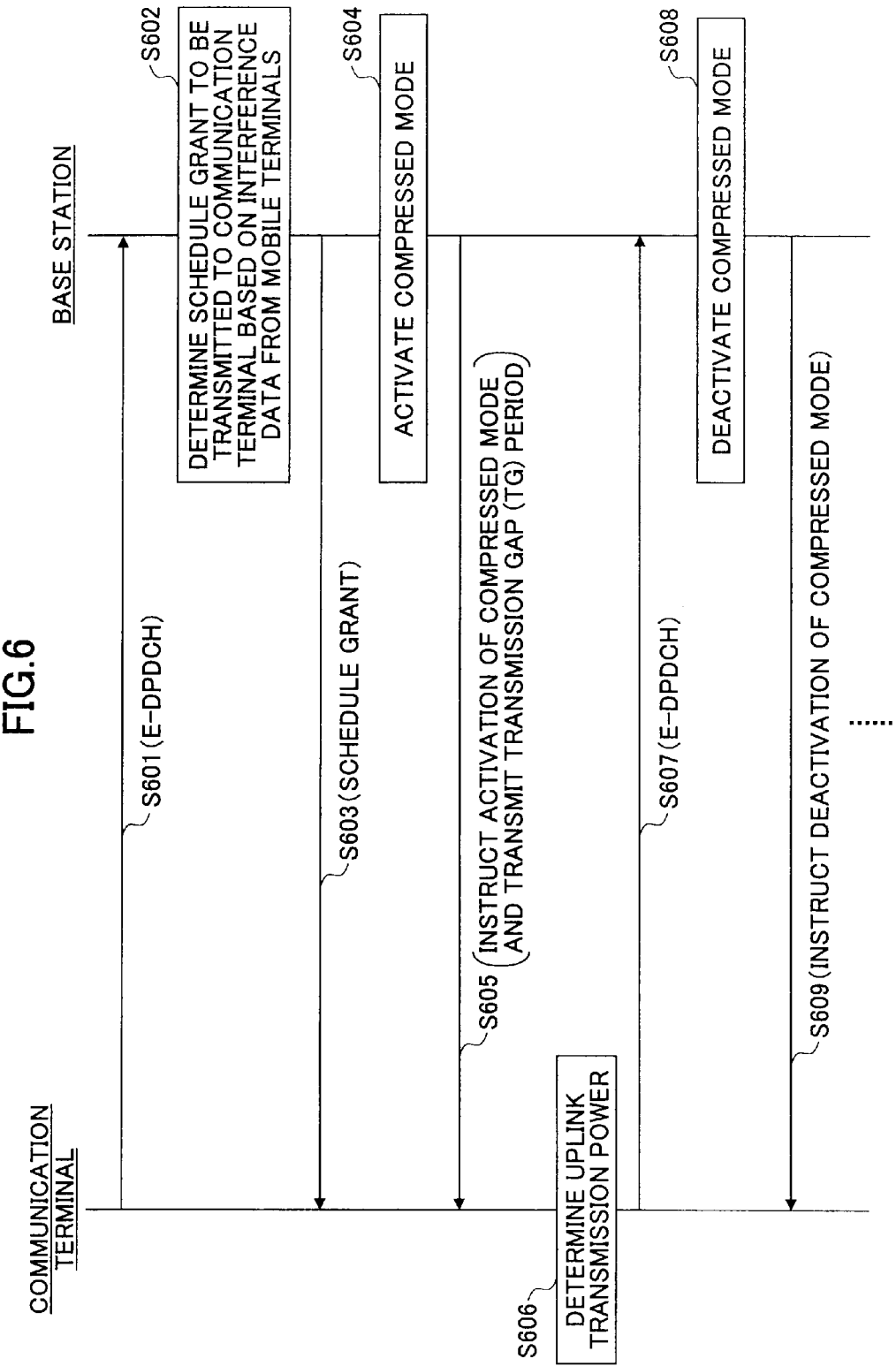
FIG. 6 is a flowchart of an overall operation according to one embodiment of the present invention.

FIG. 6 illustrates an overall operation flow (S601-S609) for use in the radio communication system in FIG. 5 according to one embodiment of the present invention.

At step S601, the communication terminals MSs transmit data in radio transmission channels called E-DPDCHs (Enhanced-Dedicated Physical Data Channels).

At step S602, the base station BS measures interference of the E-DPDCHs transmitted from the communication terminals. Depending on the measured interference, the base station BS determines a schedule grant (SG) for each of the communication terminals and transmits the schedule grants to the communication terminals. As is known to those skilled in the art, the schedule grants SG may specify radio resources available for the respective communication terminals to transmit data channels.

At step S603, the base station BS transmits downlink control signals including the schedule grants SG to the communication terminals.

In this embodiment, the base stations use different frequencies. For this reason, when a communication terminal presently communicating with a base station at one of the frequencies is handed over to another base station having a different one of the frequencies, the communication terminal must perform cell search for the different frequency (different frequency measurement). If any of the communication terminals MSs needs to conduct the different frequency measurement, at step S604, the base station BS activates the compressed mode for that communication terminal MS.

At step S605, the base station BS informs the communication terminal MS of the activation of the compressed mode, a transmission gap (TG) or others in a downlink control signal. In the compressed mode, the communication terminal MS interrupts communications during the transmission gap, switches to a different frequency for cell search and then restores the original frequency.

At step S606, in order to transmit uplink signals, the communication terminal MS determines uplink transmission power based on the schedule grant SG received from the base station BS and the operating mode (whether the operating mode is set to the compressed mode). The determination of the uplink transmission power is described in detail below.

At step S607, the communication terminal transmits the uplink signals (E-DPDCHs) at the power level determined at step S606.

At step S608, the base station BS determines whether the communication terminal MS has to conduct the different frequency measurement any more, and if the communication terminal MS does not have to conduct the different frequency measurement any more, the base station BS deactivates the compressed mode.

Figure 7:
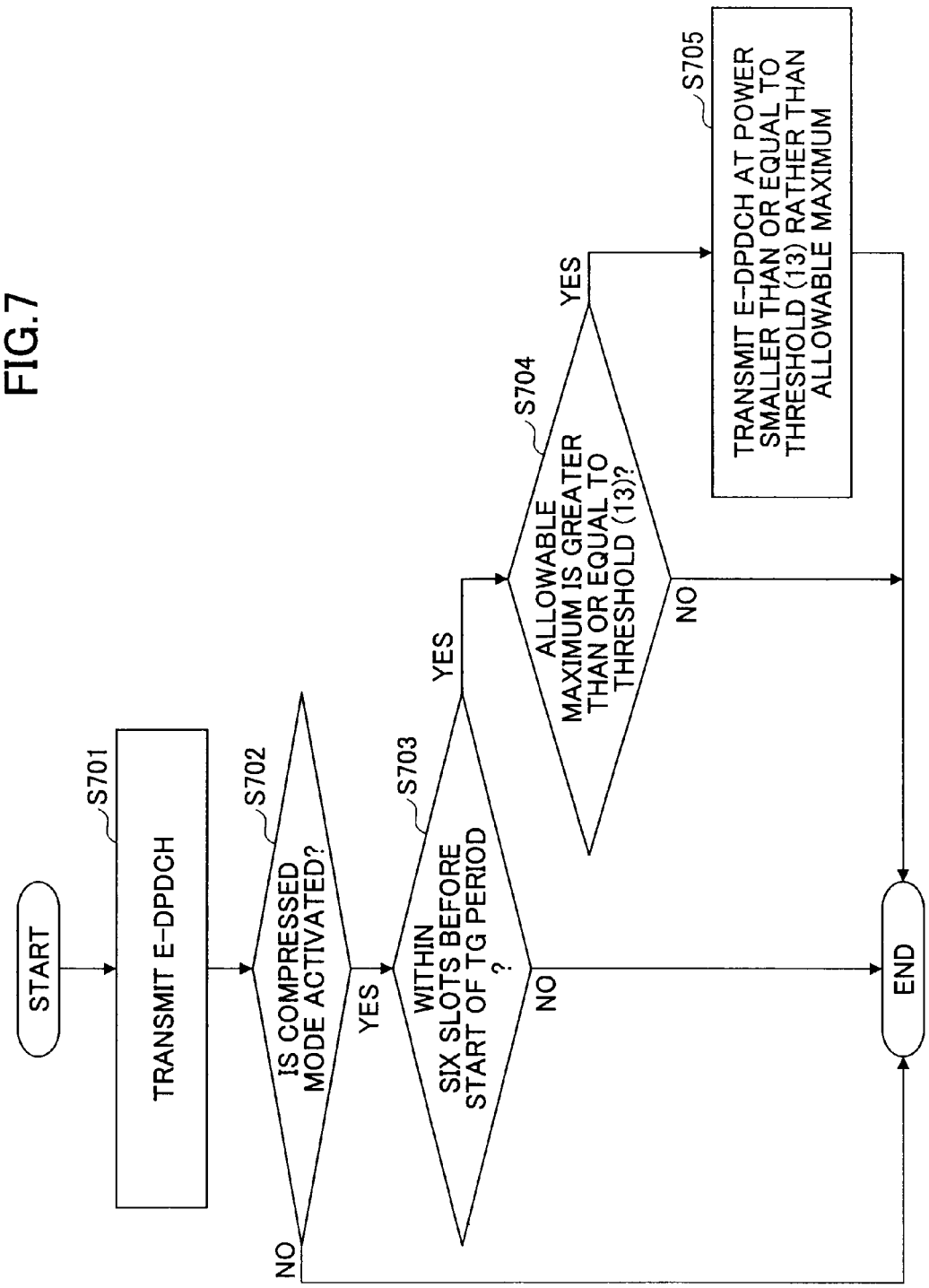
FIG. 7 is a flowchart of an exemplary detailed operation of step S6 in FIG. 6.

At step S609, the base station BS transmits the deactivation of the compressed mode to the communication terminal MS.
First Transmission Power Control Method FIG. 7 illustrates an exemplary detailed operation flow (S701-S705) of step S606 in FIG. 6.

At step S701 corresponding to step S601 in FIG. 6, the communication terminal MS transmits data in an E-DPDCH.

At step S702, the communication terminal MS determines whether the compressed mode is activated. If the compressed mode is not activated, that is, if the operating mode is not set to the compressed mode, the communication terminal MS sets the uplink transmission power at or below the allowable maximum level derived from the schedule grant SG. The schedule grant SG may include an index for designating any of various allowable maximum levels.

FIG. 8 illustrates exemplary correspondence between the indices and the allowable maximum levels. The base station BS and the mobile station MS store the correspondence in respective memories. For example, if the schedule grant SG transmitted from the base station BS includes index "30", the corresponding allowable maximum level of uplink transmission power for the communication terminal MS would be equal to $(95/15)^2 \times 4$. The value "$95^2 \times 4$" corresponds to power of data signals (square of amplitude), and the value "$15^2$" corresponds to power of pilot signals (square of amplitude).

According to this schedule grant SG, the communication terminal MS is allowed to transmit uplink signals at or below the power level $(95/15)^2 \times 4$. If the communication terminal MS has a large amount of information to be transmitted, the communication terminal MS can achieve faster throughput by transmitting the uplink signals at the allowable maximum level. On the other hand, if the communication terminal has a small amount of information to be transmitted, the communication terminal MS can inhibit excessive radiation of electric waves in the environment and reduce inner-cell interference by transmitting the uplink signals below the allowable maximum level. Based on such determination criteria, the communication terminal MS can determine the uplink transmission power. In other words, the communication terminal MS determines whether to increase or decrease the uplink transmission power by itself, which differs from the W-CDMA scheme where the base station BS instructs the communication terminal MS in TPC bits to increase or decrease the uplink transmission power.

On the other hand, if it is determined that the operating mode is set to the compressed mode at step S702 in FIG. 7, the flow proceeds to step S703. In this case, the communication terminal MS has already received information on the compressed mode from the base station BS (step S605 in FIG. 6). Particularly, at this time point, the communication terminal MS already has at least knowledge of when the transmission gap period is scheduled to arrive.

At step S703, the communication terminal MS determines whether the current time point is within a predefined period (e.g., six slots) immediately before the start of the transmission gap period TG. As one example, the schedule grant may be updated for each subframe of 2 ms, the subframe consisting of three slots. In this example, it is determined whether the current time point reaches two subframes before the transmission gap period. However, the above-mentioned specific values for the periods, subframes and slots are simply illustrative, and any other appropriate value may be applied.

If the current time point is not within six slots immediately before the start of the transmission gap period TG, the uplink transmission power is determined similar to the case where the compressed mode is not activated. In other words, the uplink transmission power may be determined at or below the allowable maximum power level derived from the schedule grant SG.

On the other hand, if the current time point is within six slots immediately before the start of the transmission gap period TG, the flow proceeds to step S704. At step S704, the allowable maximum power level derived from the schedule grant SG is compared to a predefined threshold. As one example, it is assumed that the index corresponding to the threshold is equal to "13" in the correspondence table in FIG. 8. Specifically, the index corresponding to the allowable maximum power level is compared to the index corresponding to the threshold at step S704. Based on the comparison, if the index corresponding to the allowable maximum power level is less than the index corresponding to the threshold, the uplink transmission power is determined similar to the case of the compressed mode not being activated. Note that the magnitude relationship between the indices is equivalent to the magnitude relationship between the power levels.

Figure 9:
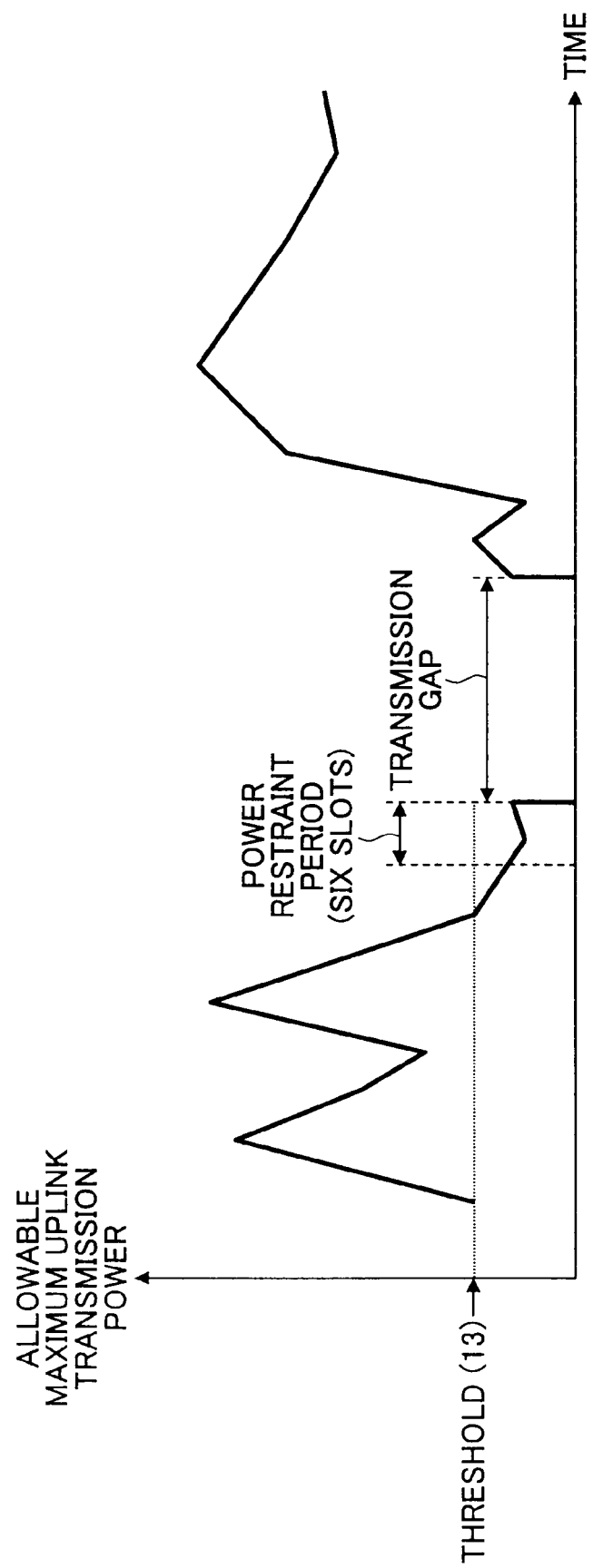
FIG. 9 illustrates an exemplary case where the allowable maximum power level does not exceed a threshold.

FIG. 9 illustrates the case where the allowable maximum transmission power level is less than the threshold at step S704 in FIG. 7. In this case, the uplink transmission power may be set to or below the allowable maximum power level derived from the schedule grant SG.

Based on the comparison at step S704 in FIG. 7, if the allowable maximum power level is higher than or equal to the threshold, the flow proceeds to step S705. At step S705, the uplink transmission power is bound to at most the threshold corresponding to index "13" independent of the allowable maximum power level derived from the schedule grant. For example, if the index corresponding to the allowable maximum power level is equal to "20", the uplink transmission power can be set to at most a power level corresponding to index "13" rather than one corresponding to index "20".

Figure 10:
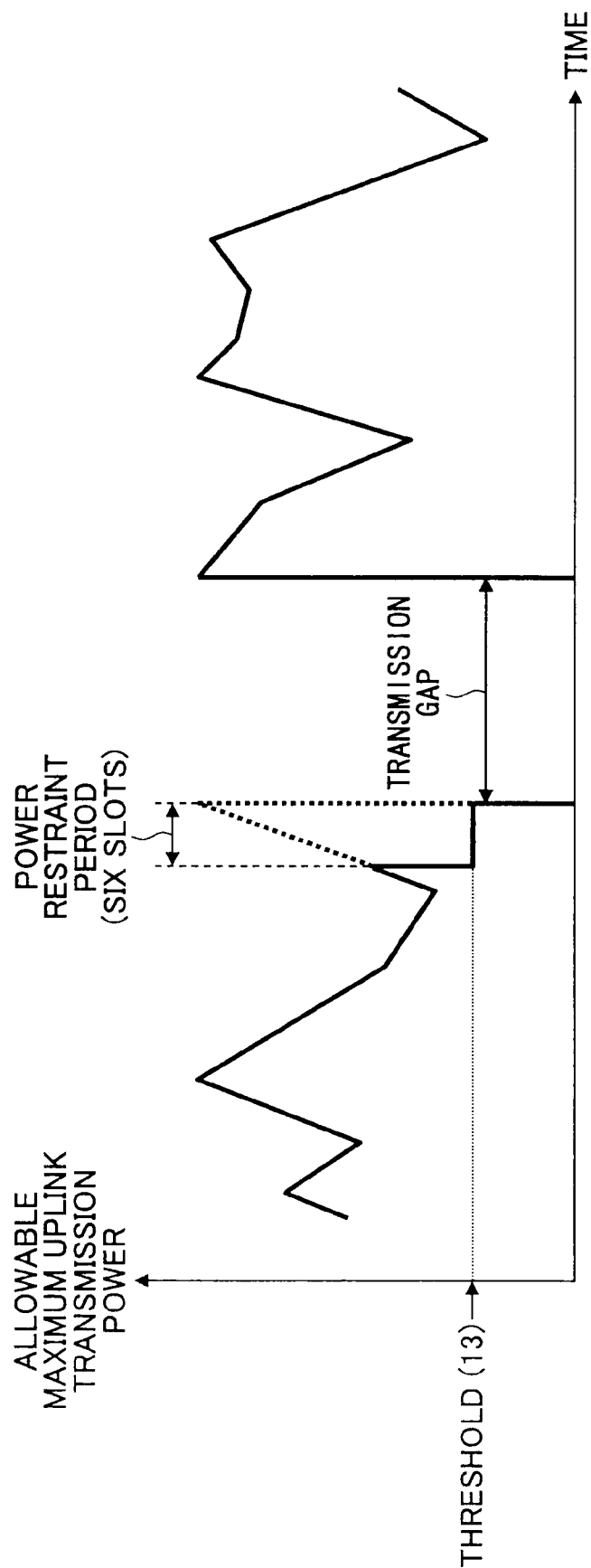
FIG. 10 illustrates an exemplary case where the allowable maximum power level exceeds the threshold.

FIG. 10 illustrates the case where the allowable maximum transmission power level is bound at step S705. In this case, the allowable maximum level is bound to threshold "13" within six slots immediately before the transmission gap period TG. In this manner, the power level immediately after entering the transmission gap period can be bound to a lower power level corresponding to at most threshold "13".

In the embodiment illustrated in FIG. 10, the allowable maximum transmission power level is bound to threshold "13" during the power restraint period consisting of two subframes equivalent to six slots) uniformly. However, the present invention is not limited to the embodiment. In other embodiments, the transmission power may be bound to different levels during the first subframe and the second subframe of the two subframes in the power restraint period.

Figure 11:
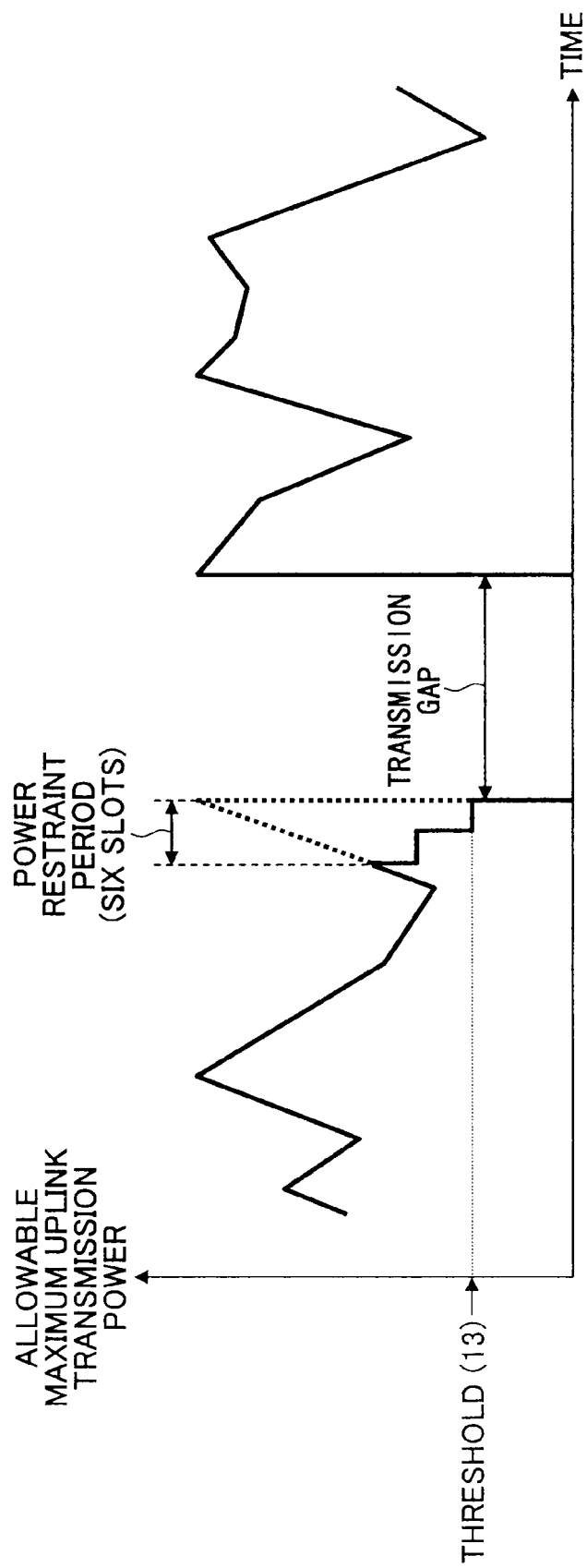
FIG. 11 illustrates that the transmission power is controlled in two steps.

FIG. 11 illustrates the case where the transmission power is bound to first threshold "20" during the first subframe and second threshold "13" during the second subframe. In this embodiment, the transmission power is bound to the two different thresholds. In other embodiments, however, the transmission power may be bound to three or more thresholds.

The transmission power is bound at step S705 in FIG. 7 to the threshold used for comparison at step S704 but may be bound to any other value. For example, the transmission power may be bound to an average value between the allowable maximum level derived from the schedule grant SG and the threshold used at step S704.

Figure 12:
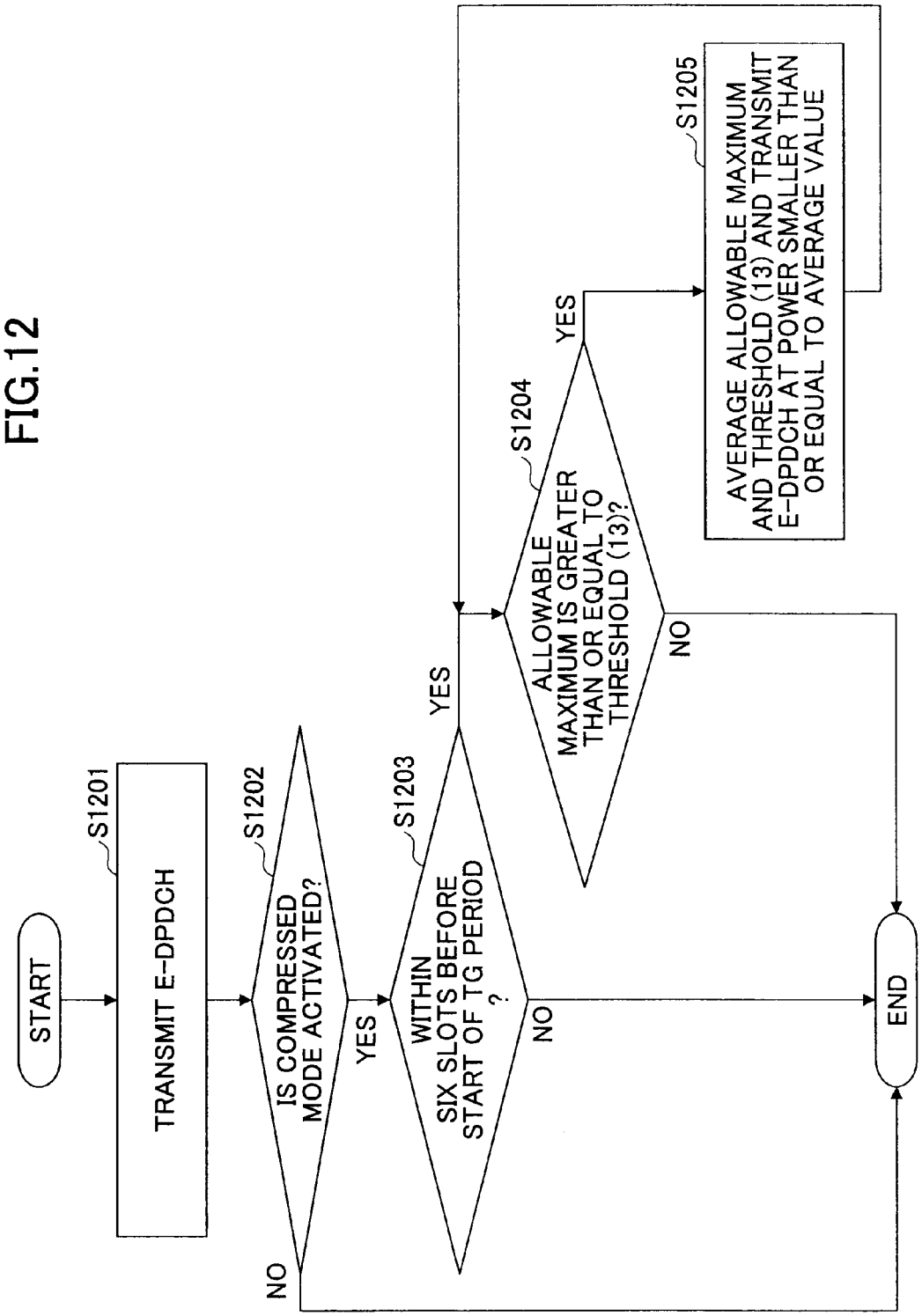
FIG. 12 illustrates an exemplary variation of the operation illustrated in FIG. 7.

FIG. 12 is a flowchart illustrating the case where the average value is applied. Although the flowchart is similar to the flowchart illustrated in FIG. 7, at step S1205, an average value between the allowable maximum level derived from the schedule grant SG and threshold "13" used at step S1204 is calculated. The uplink transmission power is bound to or below the calculated average value.

[Second Transmission Power Control Method]

Figure 13:
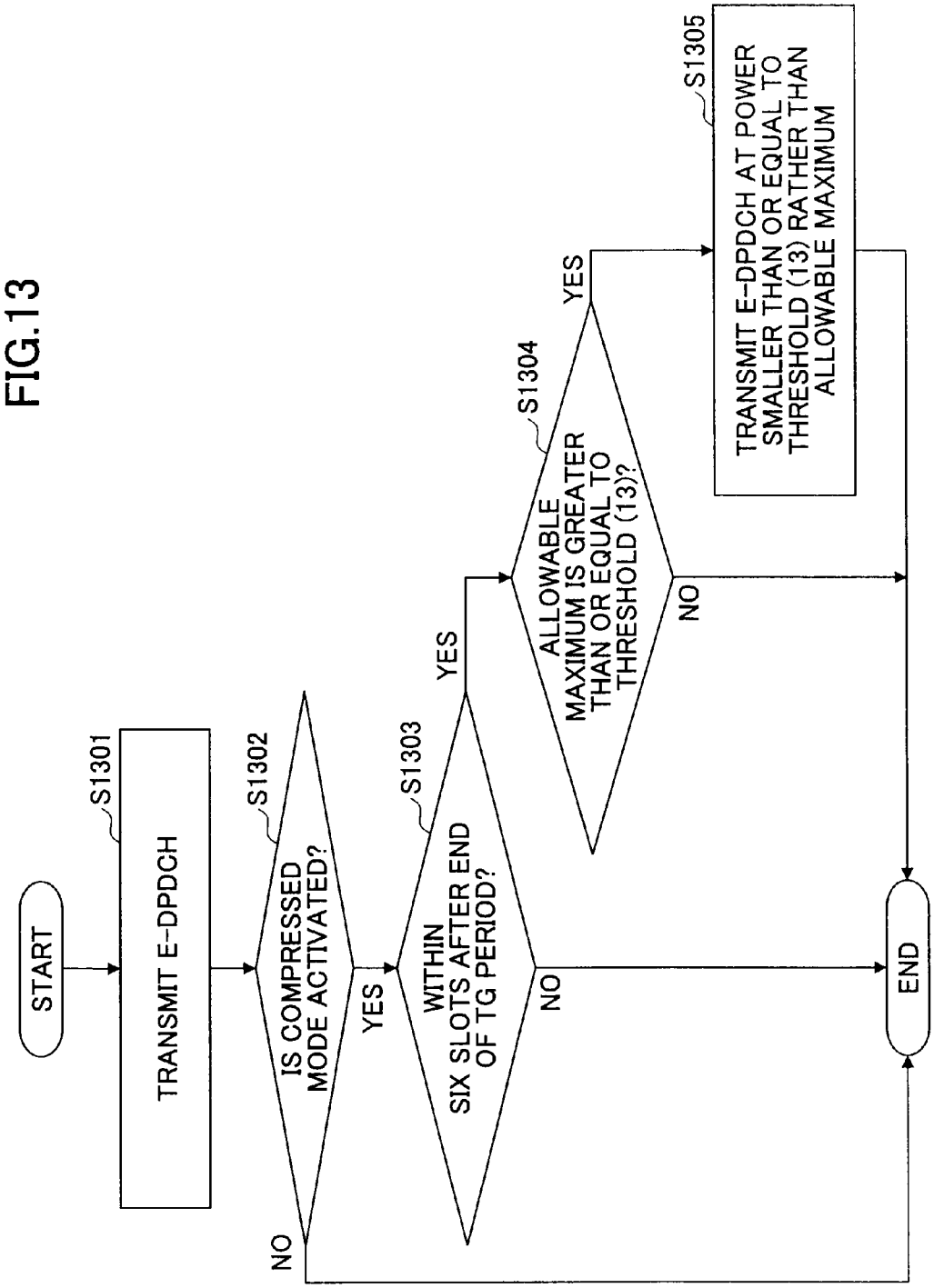
FIG. 13 is a flowchart of another detailed operation of step S6 in FIG. 6.

FIG. 13 illustrates another exemplary detailed operation flow (S1301-S1305) of step S606 in FIG. 6. This flow is similar to that in FIG. 7 except step S1303.

At step S1301, the communication terminal MS transmits data in an E-DPDCH. This step corresponds to step S601 in FIG. 6.

At step S1302, the communication terminal MS determines whether the compressed mode is activated. If the compressed mode is not activated, that is, if the operating mode is not set to the compressed mode, the communication terminal MS sets the uplink transmission power at or below the allowable maximum level derived from the schedule grant SG.

On the other hand, if the operating mode is set to the compressed mode at step S1302, the flow proceeds to step S1303.

At step S1303, the communication terminal MS determines whether the current time point is within a predefined period (e.g., six slots) immediately after the end of the transmission gap period TG. The flow in FIG. 13 differs from that in FIG. 7 in that the determination is made for immediately after the end of the transmission gap period rather than for immediately before the start of the transmission gap period. If the current time point is not within six slots immediately after the end of the transmission gap period TG, the uplink transmission power is determined similar to the case where the compressed mode is not activated. In other words, the uplink transmission power may be determined at or below the allowable maximum power level derived from the schedule grant SG.

On the other hand, if the current time point is within six slots immediately after the end of the transmission gap period TG, the flow proceeds to step S1304. At step S1304, the allowable maximum power level derived from the schedule grant SG is compared to a predefined threshold. Based on the comparison, if the index corresponding to the allowable maximum power level is less than the index corresponding to the threshold, the uplink transmission power is determined similar to the case of the compressed mode not being activated.

Figure 14:
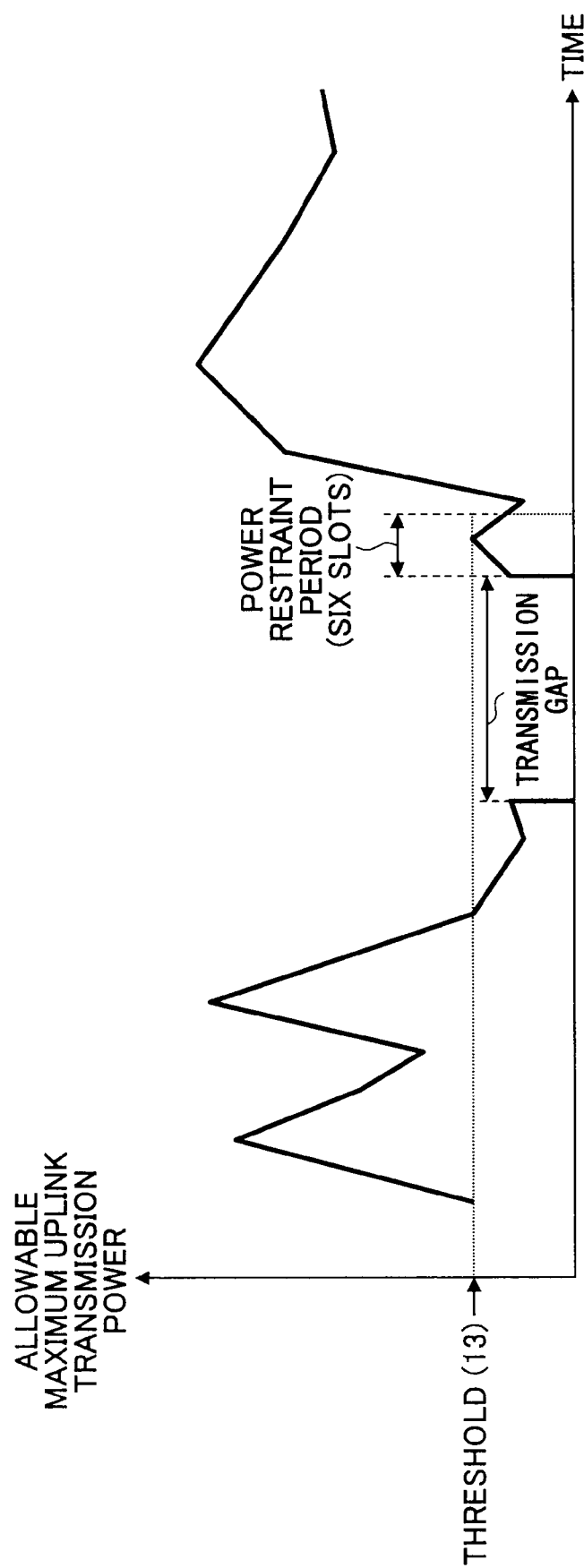
FIG. 14 illustrates an exemplary case where the allowable maximum power level does not exceed a threshold.

FIG. 14 illustrates the case where the allowable maximum transmission power level is higher than or equal to the threshold at step S1304. In this case, the uplink transmission power may be set to or below the allowable maximum level derived from the schedule grant SG.

If the allowable maximum transmission power level is higher than or equal to the threshold based on the comparison at step S1304 in FIG. 13, the flow proceeds to step S1305. At step S1305, the uplink transmission power is bound to at most the threshold, such as index "13", independent of the allowable maximum power level derived from the schedule grant. For example, if the index corresponding to the allowable maximum power level is equal to "20", the uplink transmission power can be set to at most a power level corresponding to index "13" rather than one corresponding to index "20".

Figure 15:
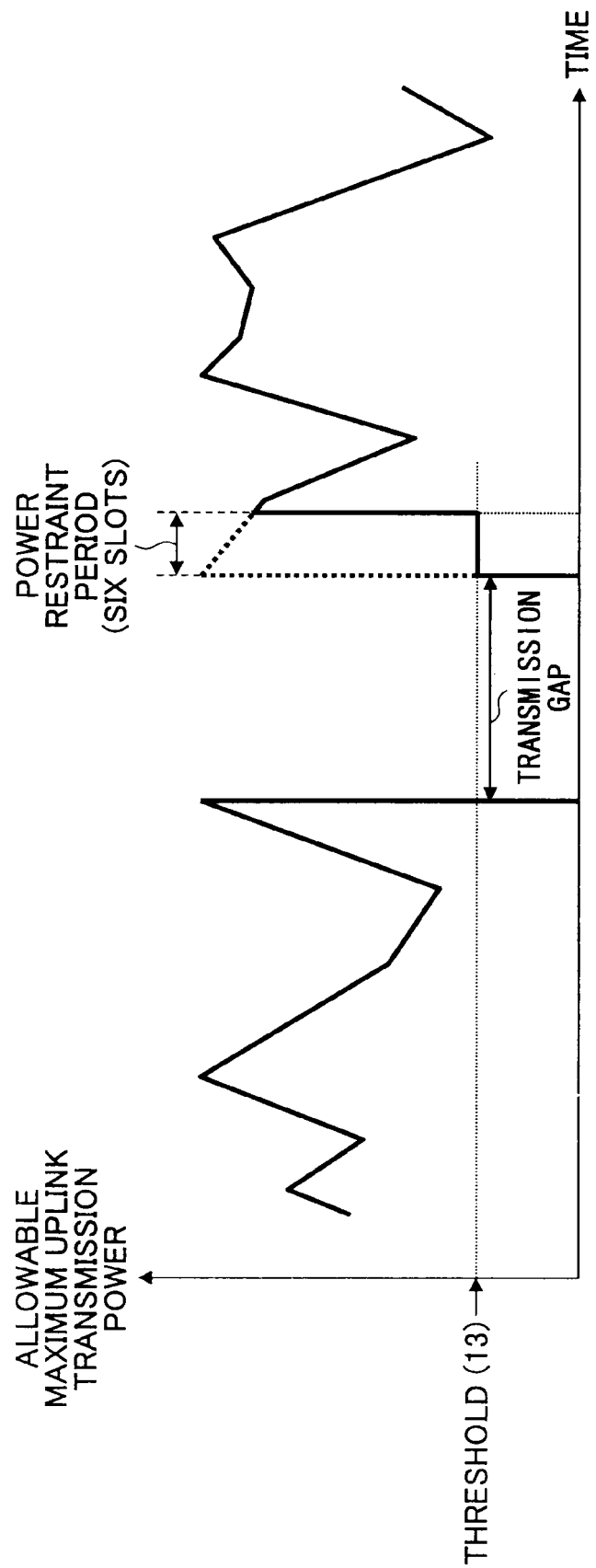
FIG. 15 illustrates an exemplary case where the allowable maximum power level exceeds the threshold.

FIG. 15 illustrates the case where the allowable maximum transmission power level is bound at step S1305. In this case, the allowable maximum level is bound to threshold "13" within six slots immediately after end of the transmission gap period TG. In this manner, the power level immediately after exiting from the transmission gap period can be bound to a lower power level corresponding to at most threshold "13".

In the embodiment illustrated in FIG. 15, the allowable maximum transmission power level is bound to threshold "13" during the power restraint period consisting of two subframes equivalent to six slots) uniformly. However, the present invention is not limited to the embodiment. In other embodiments, the transmission power may be bound to different levels during the first subframe and the second subframe of the two subframes in the power restraint period.

Figure 16:
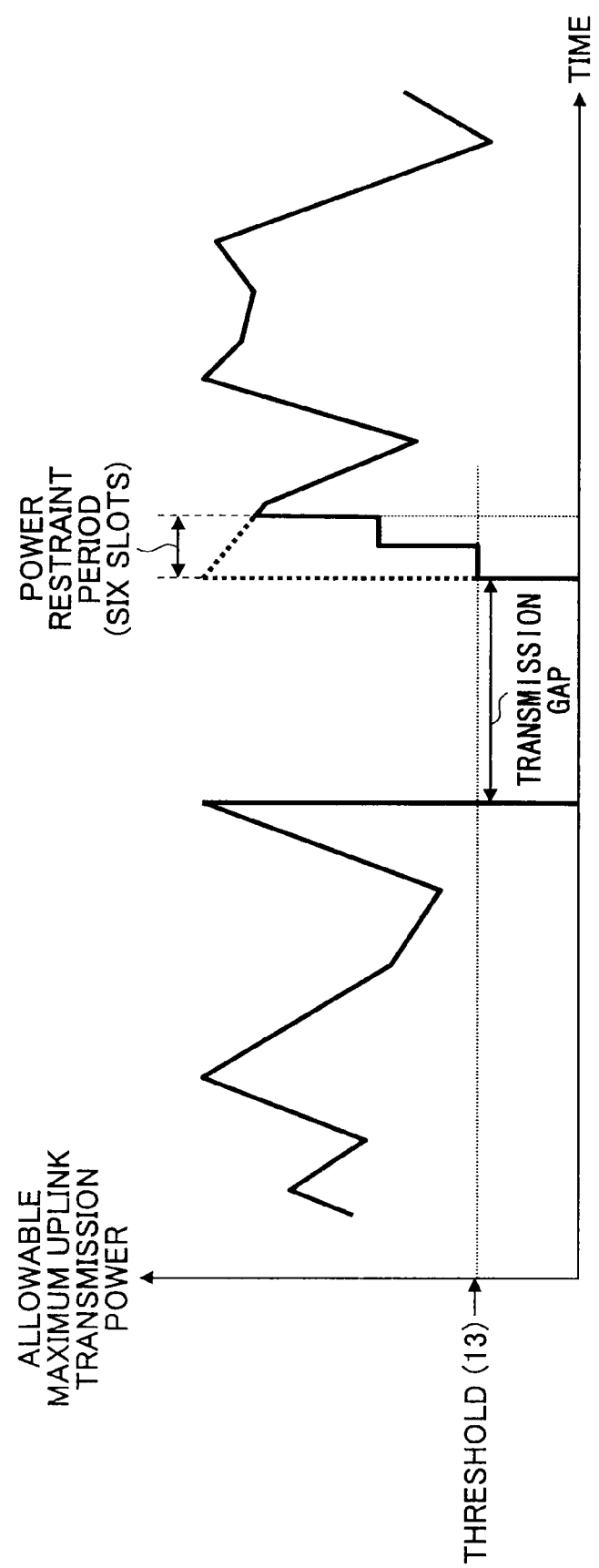
FIG. 16 illustrates that the transmission power is controlled in two steps.

FIG. 16 illustrates the case where the transmission power is bound to first threshold "13" during the first subframe and second threshold "20" during the second subframe. In this embodiment, the transmission power is bound to the two different thresholds. In other embodiments, however, the transmission power may be bound to three or more thresholds.

The transmission power is bound at step S1305 in FIG. 13 to the threshold used for comparison at step S1304 but may be bound to any other value. For example, the transmission power may be bound to an average value between the allowable maximum level derived from the schedule grant SG and the threshold used at step S1304.

Figure 17:
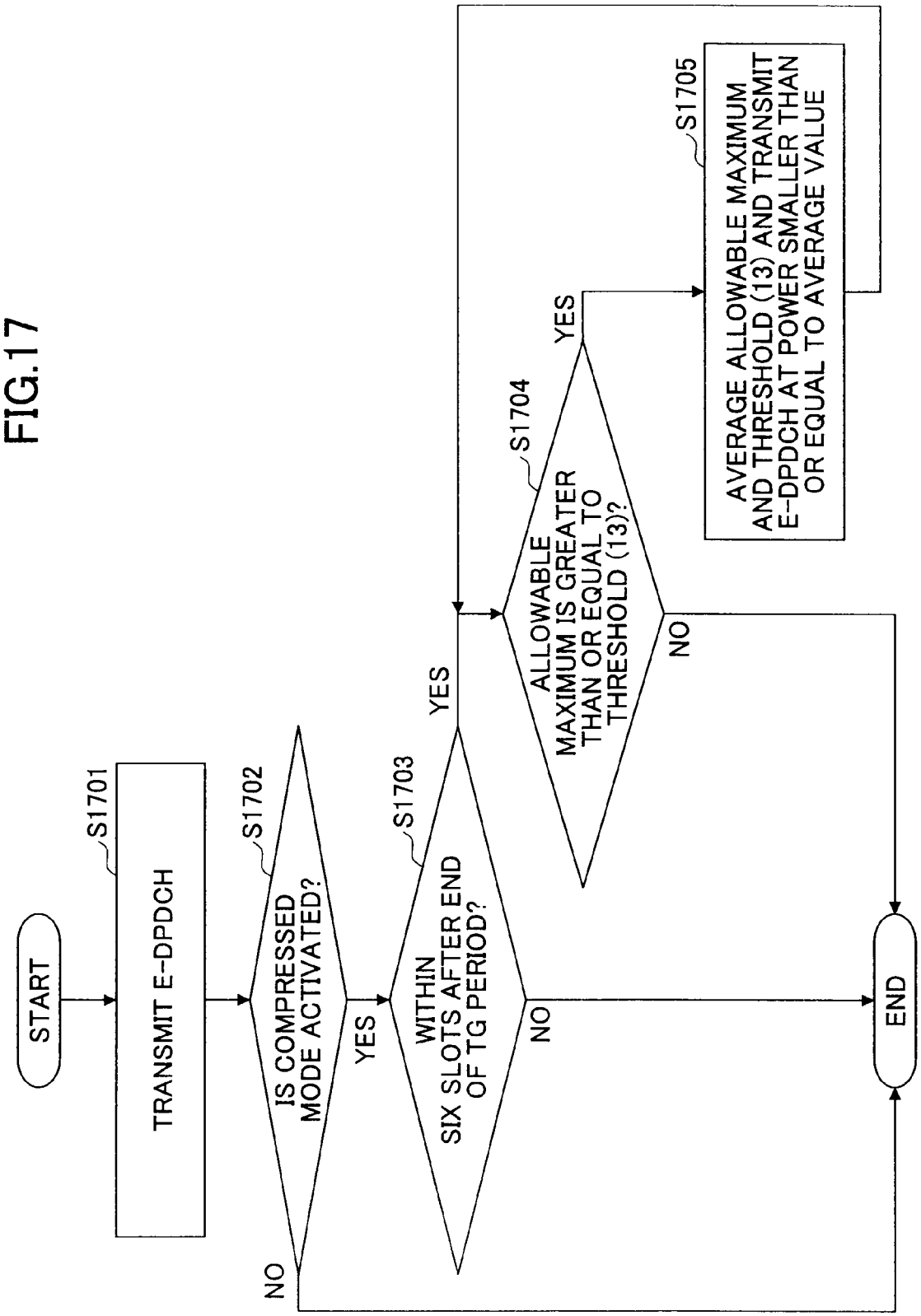
FIG. 17 illustrates an exemplary variation of the operation illustrated in FIG. 13.

FIG. 17 is a flowchart illustrating the case where the average value is applied. Although the flowchart is similar to the flowchart as illustrated in FIG. 13, at step S1705, an average value between the allowable maximum level derived from the schedule grant SG and threshold "13" used at step S1704 is calculated. The uplink transmission power is bound to or below the calculated average value.

[Third Transmission Power Control Method]

In this embodiment, either or both of the flowcharts in FIGS. 7 and 13 may be applied.

Figure 18:
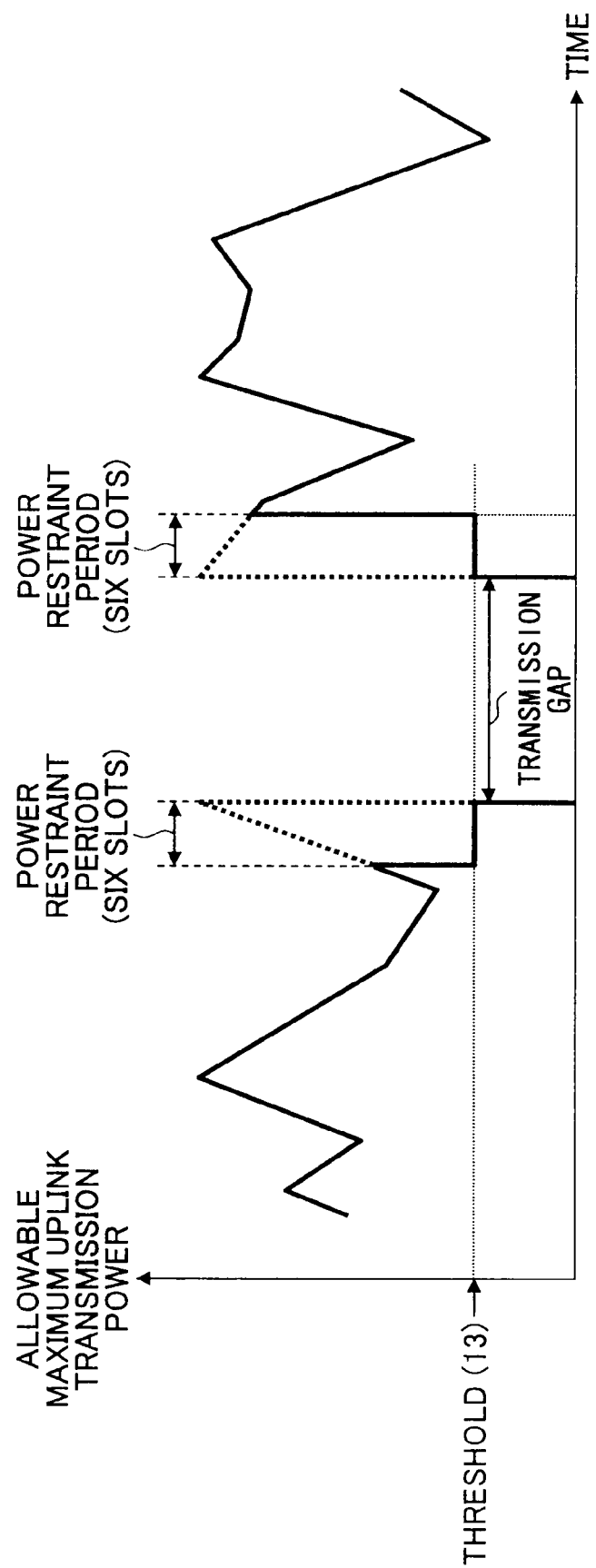
FIG. 18 illustrates that the transmission power is controlled immediately before the start of transmission gaps as well as immediately after the end of the transmission gaps.

FIG. 18 illustrates the case where the transmission power is bound both immediately before the start of the transmission gap period and immediately after the end of the transmission gap period.

[Base Station]

Figure 19:
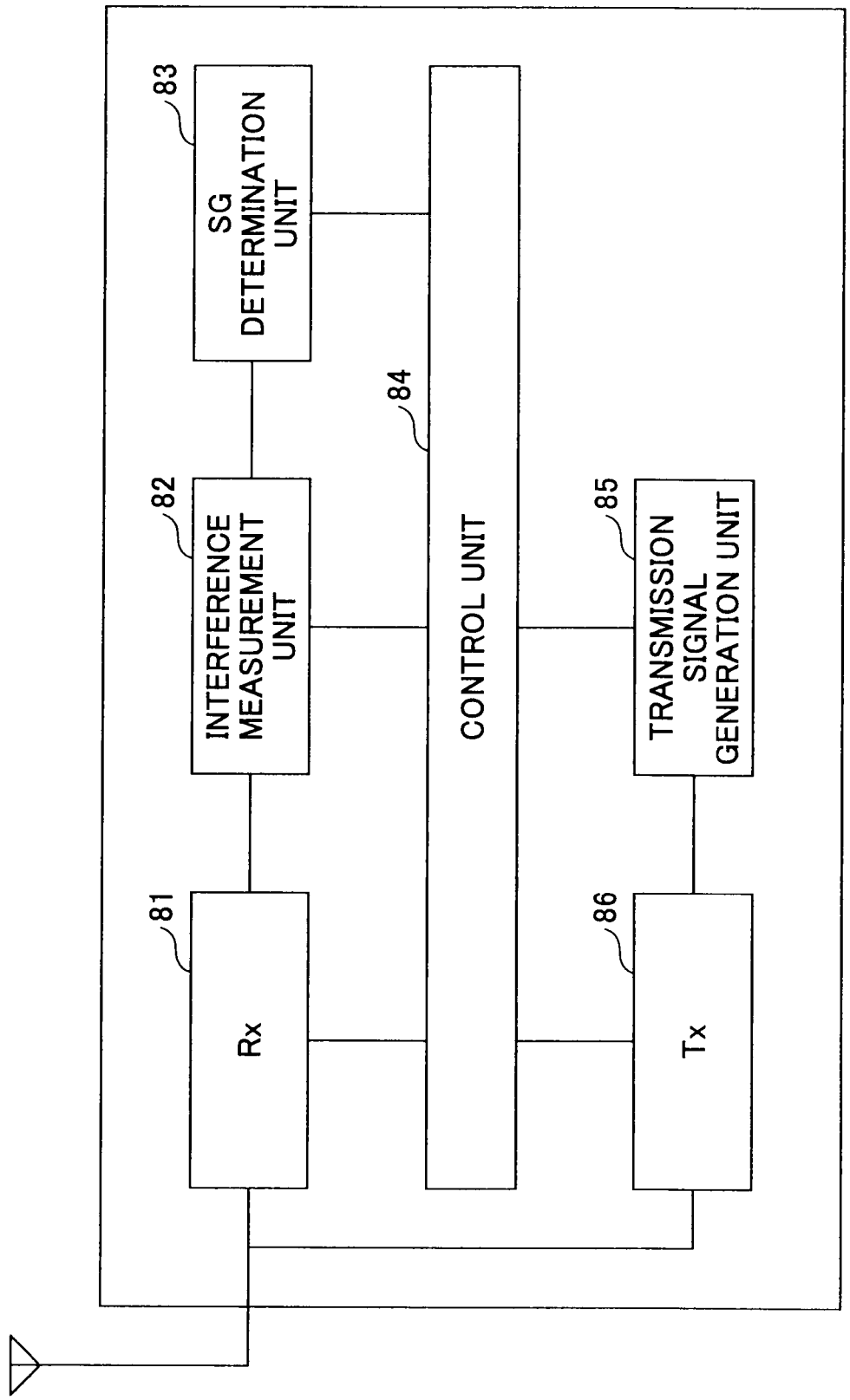
FIG. 19 is a functional block diagram illustrating a base station according to one embodiment of the present invention.

FIG. 19 is a functional block diagram illustrating a base station BS. In FIG. 19, the base station BS includes a reception unit (Rx) 81, an interference measurement unit 82, a schedule grant (SG) determination unit 83, a control unit 84, a transmission signal generation unit 85 and a transmission unit (Tx) 86.

The reception unit (Rx) 81 receives uplink signals from communication terminals. Particularly, the reception unit 81 receives data channels E-DPDCHs and decode and demodulates them.

The interference measurement unit 82 measures reception quality of the data channel E-DPDCH. The reception quality may be represented as a SIR (Signal to Interference Ratio), a bit error rate, a S/N (Signal to Noise Ratio), a Ec/No or any other appropriate indicator. Alternatively, the reception quality may be represented as a reception power level, a field intensity level, a RSSI (Received Signal Strength Indicator) or any other appropriate indicator.

The schedule grant determination unit 83 schedules radio resources based on an amount of interference from communication terminals. In this embodiment, the schedule grant determination unit 83 particularly determines indices for specifying the allowable maximum uplink transmission power levels for different communication terminals.

The control unit 84 controls operations of components in the base station BS.

The transmission signal generation unit 85 generates downlink signals including one or more of downlink control signals, downlink data signals, pilot signals and other signals.

The transmission unit (Tx) 86 converts digital signals generated by the transmission signal generation unit 85 into radio signals and transmits them.

[Communication Terminal]

Figure 20:
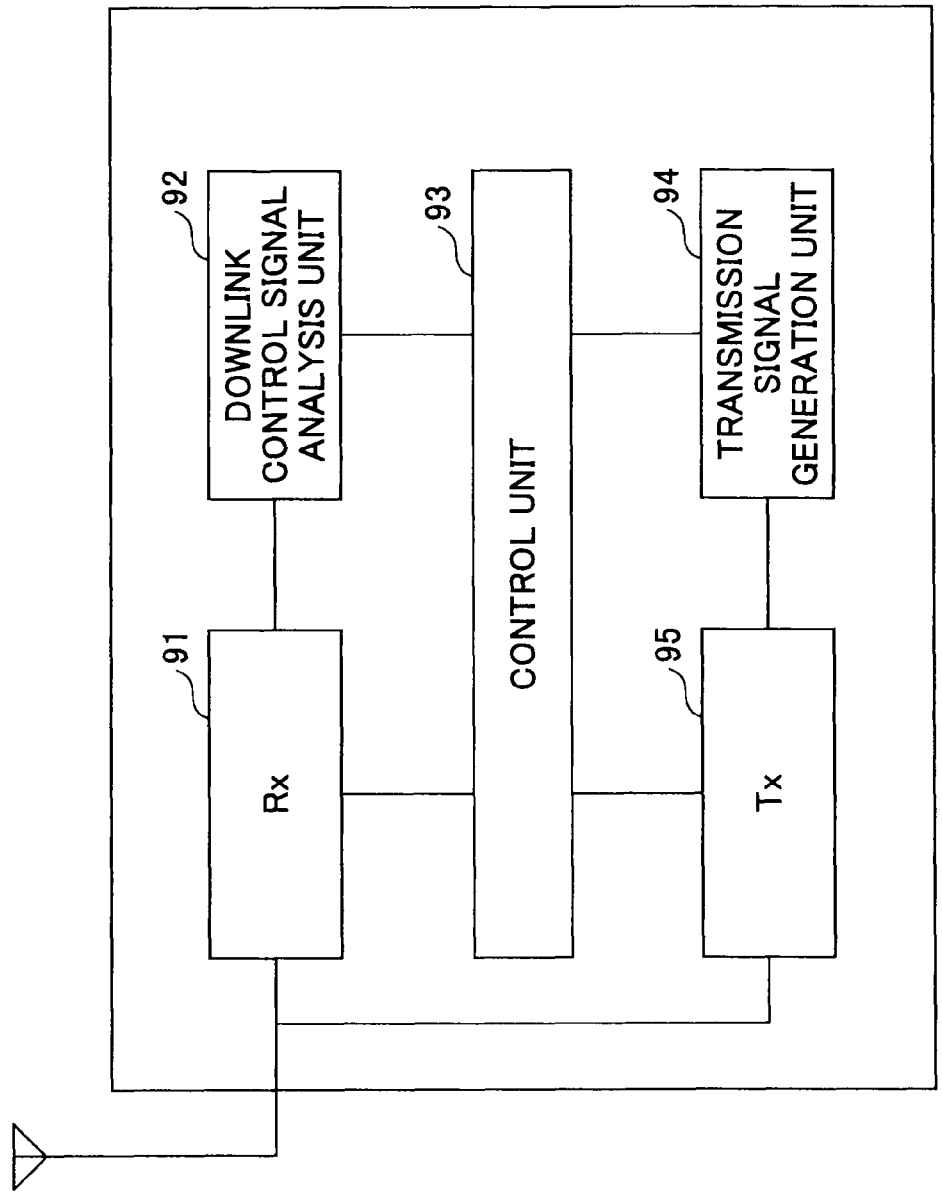
FIG. 20 is a functional block diagram illustrating a communication terminal.

FIG. 20 is a functional block diagram illustrating a communication terminal. In FIG. 20 the communication terminal MS includes a reception unit (Rx) 91, a downlink control signal analysis unit 92, a control unit 93, a transmission signal generation unit 94 and a transmission unit (Tx) 95.

The reception unit (Rx) 91 receives downlink signals from base stations. As stated above, the downlink signal includes one or more of downlink control signals, downlink data signals, pilot signals and other signals.

The downlink control signal analysis unit 92 analyzes downlink control signals. In this embodiment, the downlink control signal analysis unit 92 particularly extracts a schedule grant from the downlink control signals and assigns radio resources for downlink and/or uplink communications. If uplink transmission is enabled, the schedule grant includes an index for specifying the allowable maximum uplink transmission power. Also, in the compressed mode, the downlink control signal analysis unit 92 receives downlink control signals and/or pilot signals at different frequencies and performs different frequency measurement.

The control unit 93 controls operations of components in the communication terminal MS.

The transmission signal generation unit 94 generates uplink signals including one or more of uplink control signals, uplink data signals, pilot signals and other signals.

The transmission unit (Tx) 95 converts digital signals generated by the transmission signal generation unit 94 into radio signals and transmits them. The transmission is carried out at the uplink transmission power determined by the control unit 93.

Figure 21:
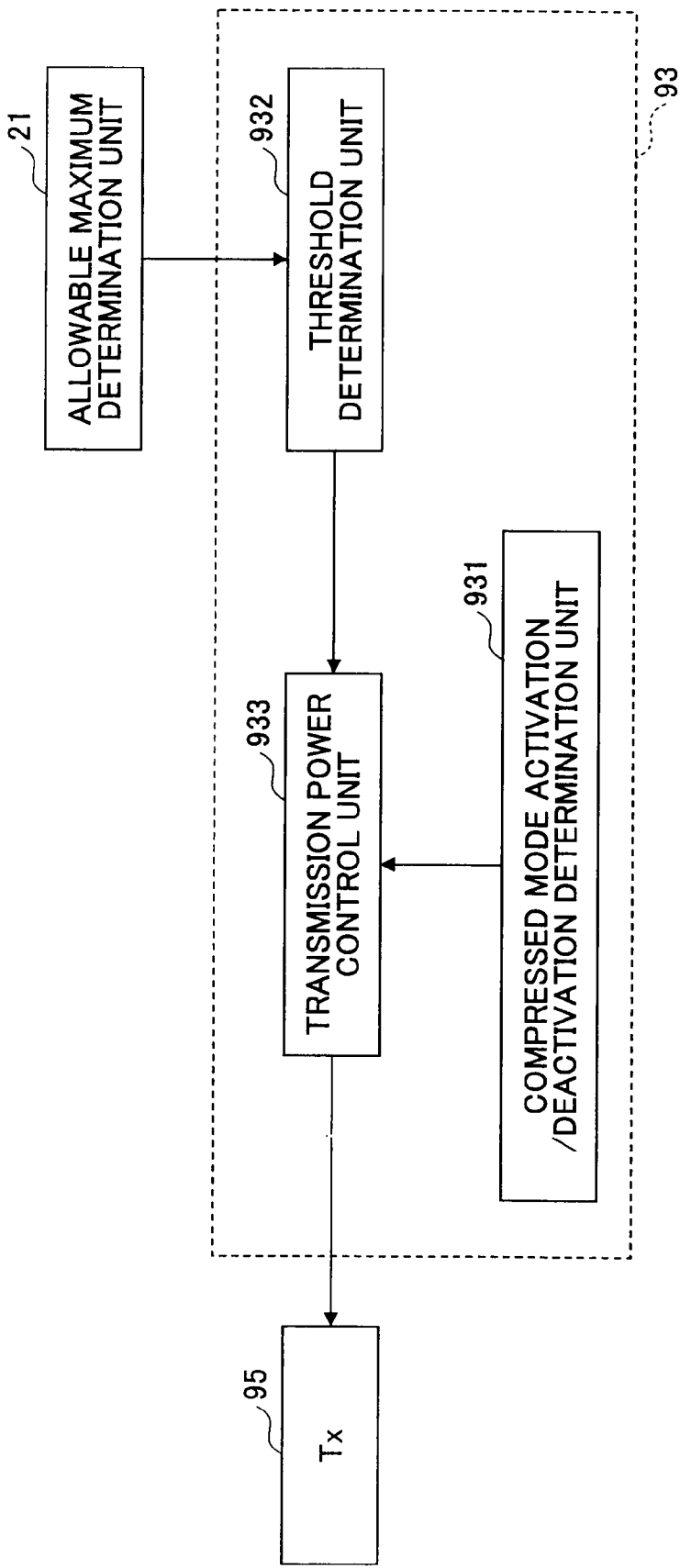
FIG. 21 is a functional block diagram illustrating a control unit in the communication terminal.

FIG. 21 is a functional block diagram illustrating the control unit 93 in the communication terminal MS. In FIG. 21, the control unit 93 is coupled to the transmission unit 95 and an allowable maximum determination unit 21 and includes a compressed mode activation/deactivation determination unit 931, a threshold determination unit 932 and a transmission power control unit 933.

The allowable maximum determination unit 21 belongs to the downlink control signal analysis unit 92 and uses a table as illustrated in FIG. 8 to determine an index designated in the schedule grant. In other embodiments, the allowable maximum determination unit 21 may be included in the control unit 93.

The compressed mode activation/deactivation determination unit 931 determines whether the communication terminal MS is to operate in the compressed mode based on instructions from base stations.

The threshold determination unit 932 compares the allowable maximum level with a threshold for magnitude and supplies the comparison.

The transmission power control unit 933 determines the uplink transmission power based on the determination as to whether the current operating mode is the compressed mode and the threshold comparison. The determined uplink transmission power is reported to the transmission unit 95. The uplink transmission power is determined in accordance with the above-mentioned operation flow in FIGS. 7 and 13.

The present invention may be applied to any appropriate radio communication system where the Enhanced Uplink scheme and the compressed mode scheme are utilized. For example, the present invention may be applied to a HSDPA/HSUPA based W-CDMA system, an LTE based system, an IMT-Advanced system, a WiMAX system, a Wi-Fi based system and others.

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. For convenience, apparatuses according to the embodiments of the present invention have been described with reference to functional block diagrams, but these apparatuses may be implemented in hardware, software or combinations thereof. The software may be embodied in a RAM (Random Access Memory), a flash memory, a ROM (Read Only Memory), a EPROM (Erasable Programmable ROM), a EEPROM (Electrically EPROM), a register, a hard disk drive (HDD), a removable disk, CD-ROM (Compact Disk-ROM) and any other appropriate storage medium. The present invention is not limited to the above embodiments, and variations, modifications, alterations and substitutions can be made by those skilled in the art without deviating from the spirit of the present invention.

The present application is based on Japanese Priority Application No. 2009-103133 filed on Apr. 21, 2009, the entire contents of which are hereby incorporated by reference.

What is claimed is:

1. A communication terminal in an Enhanced Uplink based radio communication system, comprising:
    a determination unit configured to analyze a received downlink control signal and determine an allowable maximum uplink transmission power level;
    a measurement unit configured to perform different frequency measurement in a transmission gap period;
    a threshold determination unit configured to determine whether the allowable maximum uplink transmission power level is higher than or equal to a threshold within a predefined period before a start of the transmission gap period and/or after an end of the transmission gap period;
    a transmission power control unit configured to set an uplink transmission power level; and
    a transmission unit configured to transmit an uplink signal at the uplink transmission power level determined by the uplink transmission power control unit, wherein
    if the allowable maximum uplink transmission power level is higher than or equal to the threshold, the transmission power control unit sets the uplink transmission power level to or below a predefined level lower than the allowable maximum uplink transmission power level within the predefined period before the start of the transmission gap period and/or after the end of the transmission gap period.

2. The communication terminal as claimed in claim 1, wherein the transmission unit transmits a portion of the uplink signal at a first uplink transmission power level lower than the allowable maximum uplink transmission power level and the other portion of the uplink signal at a second uplink transmission power level lower than the allowable maximum uplink transmission power level within the predefined period before the start of the transmission gap period and/or after the end of the transmission gap period.

3. The communication terminal as claimed in claim 2, wherein the first or second transmission power level corresponds to an average power level between the allowable maximum uplink transmission power level and the threshold.

4. A method for use in a communication terminal in an Enhanced Uplink based radio communication system wherein the communication terminal includes a determination unit configured to analyze a received downlink control signal and determine an allowable maximum uplink transmission power level and a measurement unit configured to perform different frequency measurement in a transmission gap period, the method comprising:
    determining whether the allowable maximum uplink transmission power level is higher than or equal to a threshold within a predefined period before a start of the transmission gap period and/or after an end of the transmission gap period;
    setting an uplink transmission power level; and
    transmitting an uplink signal at the uplink transmission power level determined at the setting step, wherein
    if the allowable maximum uplink transmission power level is higher than or equal to the threshold, the step of setting comprises setting the uplink transmission power level to or below a predefined level lower than the allowable maximum uplink transmission power level within the predefined period before the start of the transmission gap period and/or after the end of the transmission gap period.

5. An Enhanced Uplink based radio communication system, comprising:
    a communication terminal; and
    a base station configured to measure interference of an uplink signal for the communication terminal, determine an allowable maximum uplink transmission power level for the communication terminal based on the interference and transmit a downlink control signal indicative of the allowable maximum uplink transmission power level, wherein
    the communication terminal includes a determination unit configured to analyze the received downlink control signal and determine the allowable maximum uplink transmission power level; a measurement unit configured to perform different frequency measurement in a transmission gap period; a threshold determination unit configured to determine whether the allowable maximum uplink transmission power level is higher than or equal to a threshold within a predefined period before a start of the transmission gap period and/or after an end of the transmission gap period; a transmission power control unit configured to set an uplink transmission power level; and a transmission unit configured to transmit an uplink signal at the uplink transmission power level determined by the uplink transmission power control unit, and
    if the allowable maximum uplink transmission power level is higher than or equal to the threshold, the transmission power control unit sets the uplink transmission power level to or below a predefined level lower than the allowable maximum uplink transmission power level within the predefined period before the start of the transmission gap period and/or after the end of the transmission gap period.

* * * * *